United States Patent
Newberry

(10) Patent No.: US 8,206,541 B2
(45) Date of Patent: Jun. 26, 2012

(54) FINISHED CARBON FIBER COLLAR STAYS AND RELATED METHODS

(76) Inventor: Kirtis John Newberry, El Dorado Hills, CA (US)

( * ) Notice: Subject to any disclaimer, the term of this patent is extended or adjusted under 35 U.S.C. 154(b) by 595 days.

(21) Appl. No.: 12/333,023

(22) Filed: Dec. 11, 2008

(65) Prior Publication Data

US 2009/0144879 A1 Jun. 11, 2009

Related U.S. Application Data

(60) Provisional application No. 61/012,881, filed on Dec. 11, 2007.

(51) Int. Cl.
 B32B 37/00 (2006.01)
 B32B 37/14 (2006.01)
 B32B 38/00 (2006.01)
 B32B 38/04 (2006.01)
 A41D 27/16 (2006.01)

(52) U.S. Cl. ......... 156/253; 156/250; 156/252; 156/256

(58) Field of Classification Search .................. 156/250, 156/252, 253, 256; 2/132
See application file for complete search history.

(56) References Cited

U.S. PATENT DOCUMENTS

| | | | | |
|---|---|---|---|---|
| 2,723,705 A * | 11/1955 | Collins | ......................... | 156/177 |
| 3,504,378 A | 4/1970 | Teperson | | |
| 4,274,901 A * | 6/1981 | Elber | ............................ | 156/242 |
| 4,659,624 A | 4/1987 | Yeager et al. | | |
| 5,595,692 A * | 1/1997 | Folsom et al. | ............... | 264/36.1 |
| 5,646,076 A * | 7/1997 | Bortz | ............................ | 442/136 |
| 5,954,898 A * | 9/1999 | McKague et al. | .............. | 156/64 |
| 6,089,422 A | 7/2000 | Gibson | | |
| 2001/0030017 A1 * | 10/2001 | Sato | ............................ | 156/199 |
| 2004/0137203 A1 * | 7/2004 | Adams et al. | ............. | 428/195.1 |
| 2007/0204374 A1 | 9/2007 | Bier et al. | | |

OTHER PUBLICATIONS

SF—Collar stays of appropriate size—Style Forum retrieved from the Internet Mar. 11, 2011, 2 pages http://www.styleforum.net/showthread.php?t=20679.

Finally, the video showing my intimate encounter with the tirewall at T10 WG [Archive], retrieved from the Internet Mar. 11, 2011, http://dorkiphus.net/porsche/archive/index.php/t-10227.html, entry dated Jul. 14, 2006 at 9:02 am, 1 page.

The Laminator Seriest™ Platen Presses SDM Technology Aug. 2003; retrieved from the Internet Mar. 11, 2011, http://www.platenpress.com/presses.html, 3 pages.

ACP Composites, image Retrieved from the Internet Mar. 11, 2011, http://www.acp-composites.com/HeatedPlatenPresses.jpg, 1 page, undated.

* cited by examiner

*Primary Examiner* — Philip Tucker
*Assistant Examiner* — Christopher C Caillouet
(74) *Attorney, Agent, or Firm* — Lathrop & Gage LLP

(57) ABSTRACT

A method for manufacturing a finished carbon fiber (FCF) collar stay includes the steps of fabricating a FCF sheet having at least one design and producing a FCF collar stay from the FCF sheet. A finished carbon fiber (FCF) collar stay has at least one carbon fiber sheet impregnated with resin; the sheet may produce a plurality of like FCF stays.

15 Claims, 4 Drawing Sheets

FINISHED CARBON FIBER COLLAR STAYS AND RELATED METHODS

RELATED APPLICATIONS

This application claims priority to U.S. Provisional Application No. 61/012,881 filed Dec. 11, 2007, which is incorporated herein by reference.

BACKGROUND

A cape of a shirt collar, particularly in the area of the collar points, tends to curl up after laundering. Manufacturing companies may incorporate pockets, liners, and/or patches into the collar structure to prevent the collar from curling up. In certain more expensive shirts, pockets are sewn into the underside of the collar structure to accommodate collar stays. Collar stays may then be inserted into these pockets to stiffen and maintain the shape of the collar, and particularly the collar points. These collar stays are semi-rigid flat strips of material with a pointed end that approaches the collar point when inserted into the pocket, and a rounded end for comfort of the collar wearer and to prevent harm to the collar. They are typically made from hard cardboard, plastics, or metals. Cardboard and plastic collar stays are easily bent, become brittle, and may disintegrate, thereby failing to maintain the collar structure. Metal collar stays, though not as easily bent, tend to give the collar a stiff and unnatural appearance.

SUMMARY

In one embodiment, a method for manufacturing a finished carbon fiber (FCF) collar stay includes the steps of fabricating a FCF sheet having at least one design and producing a FCF collar stay from the FCF sheet.

In another embodiment, a finished carbon fiber (FCF) collar stay includes at least one carbon fiber sheet impregnated with resin.

DETAILED DESCRIPTION OF THE FIGURES

This disclosure relates to systems and methods for manufacturing a finished carbon fiber (FCF) collar stay.

Figure 1:
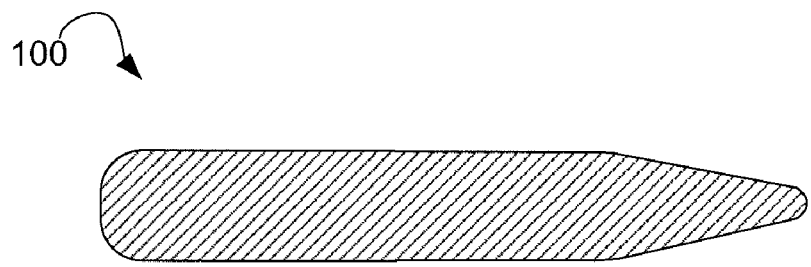
FIG. 1 shows a top view of an exemplary FCF collar stay, according to an embodiment.

FIG. 1 shows a top view of an exemplary FCF collar stay 100.

Figure 2:
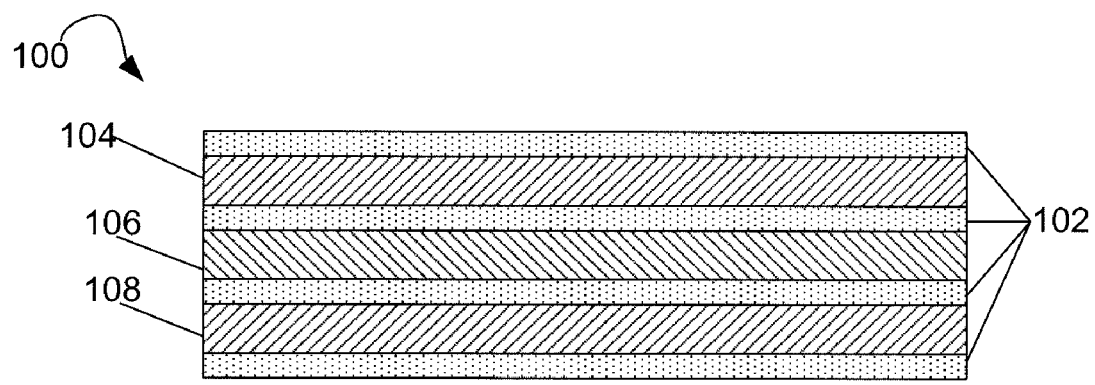
FIG. 2 shows layered structure of the FCF collar stay of FIG. 1, in an embodiment.

FIG. 2 shows a layered structure of FCF collar stay 100 of FIG. 1, since it is typically formed of more than one layer of carbon fiber material. In particular, FCF collar stay 100 is formed of one or more carbon fiber sheets 104, 106, 108 to which a resin 102 is applied. Carbon fiber sheets 104, 106, 108 are strong and light; resin 102 may be epoxy, polyester, vinyl ester, nylon and variations thereof. The combination of carbon fiber sheets 104, 106, 108 and resin 102 provides FCF collar stay 100 with strength and flexibility. Variation in strength and flexibility may be obtained by varying the number of carbon fiber sheets (e.g., one, two, three or more sheets) used to form FCF collar stay 100. Further, carbon fiber sheets 104, 106, and 108 may be arranged such that the strands of carbon fiber in these sheets are layered in non-similar directions, such as crisscross patterns, diagonal, horizontal or any combination thereof, to provide other flexibility and manufacturability.

Figure 3:
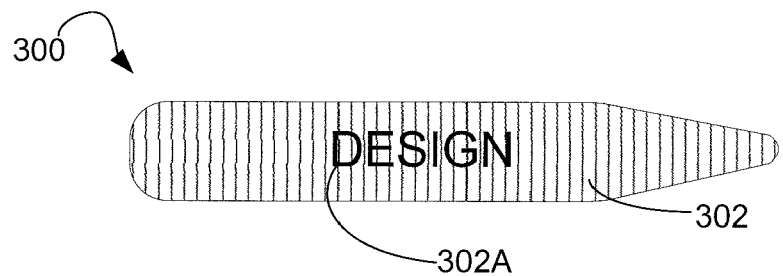
FIG. 3 shows a FCF collar stay with a design on a top surface, according to an embodiment.

The most flexible FCF collar stay 100 is obtained when FCF collar stay 100 is formed with a single carbon fiber sheet. Additional strength and reduced flexibility are obtainable with additional layers and orientations. For example, forming FCF collar stay 100 with multiple carbon fiber sheets arranged with strands in different directions provides more strength and less flexibility as compared to one that is formed with an equal number of carbon fiber sheets layered with strands in the same direction. FIG. 3 shows FCF collar stay 100 formed with three layered carbon fiber sheets where the strands of each sheet are oriented in different directions from the other layers. In an embodiment, strands of the two outside carbon fiber sheets are aligned and the strands of the center carbon fiber sheet are perpendicular. Variations in strand orientation vary the rigidity, flexibility, strength, and look of FCF collar stay 100.

In one embodiment, a fiberglass sheet is inserted between carbon fiber sheets 104 and 108 (and carbon fiber sheet 106 is removed) to reduce manufacturing cost of FCF collar stay 100 while retaining similar strength and flexibility.

In one embodiment, fibrous materials may be used in place of carbon fiber sheets 104, 106, 108 to further reduce manufacturing cost of FCF collar stay 100 without departing from the scope hereof. The fibrous materials may be fiberglass, Teflon, Kevlar or variations thereof.

The number of carbon fiber sheets and their alignment are selected to suit the application of the FCF collar stay. When inserted into a collar pocket, or constructed permanently within the collar, the strength of FCF collar stay 100 maintains the desired shape of the collar and also prevents deterioration. The flexibility of the carbon fiber sheets gives the collar shape a natural appearance.

Figure 4:
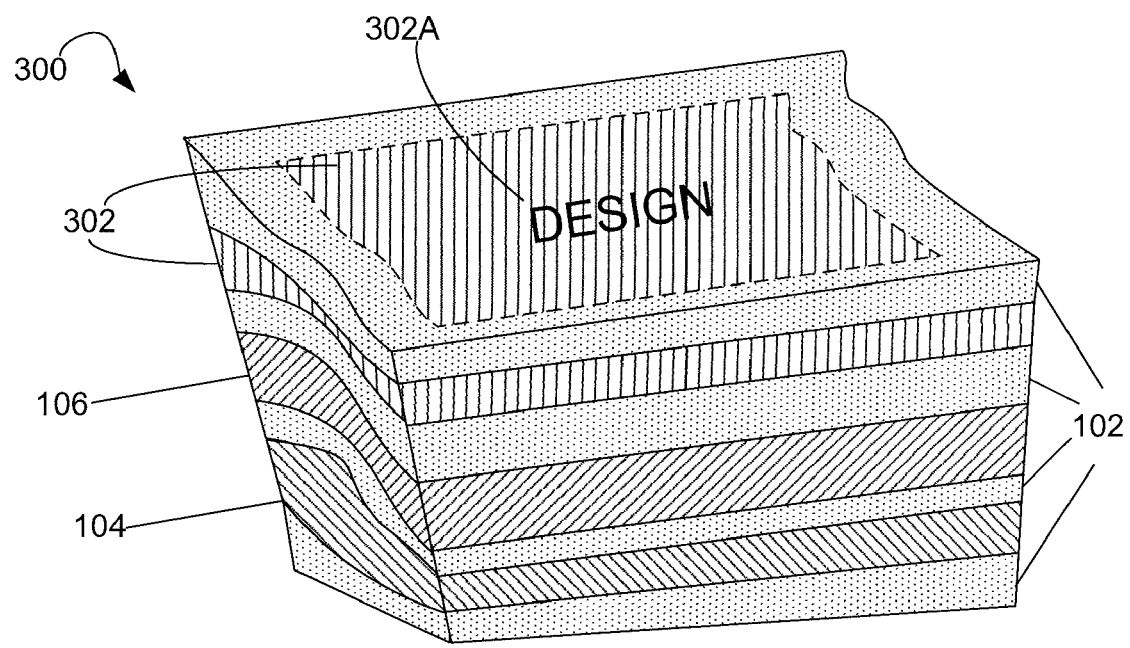
FIG. 4 shows a perspective view of the FCF collar stay of FIG. 3, in an embodiment.

FIG. 3 shows a FCF collar stay 300 with a design 302 on a top surface. FIG. 4 shows a perspective view of FCF collar stay 300 illustrating a lower sheet of carbon fiber 104, an upper sheet of carbon fiber 106, and a sheet with design 302 that are collectively combined by resin layers 102. The thickness of FCF collar stay 300 may be selected for each application. In FIG. 3, FCF collar stay 300 has a thickness defined by two carbon fiber sheets; it is layered with strands in different directions to increase strength.

Design 302 may be a design such as a plain solid color or pattern, e.g., a floral, plaid, and variations thereof. Design 302 may, in particular, be selected to match with the pattern of the shirt and/or collar into which it is intended to be incorporated. Design 302 may include symbols 302A, such as letters, non-language symbols, etc., that display a customized look. Design 302 may represent a brand name, corporate logo, wording, and combinations thereof. Language-based symbols may be used in combination with non-language based symbols for design 302.

FIG. 4 shows a perspective view of FCF stay 300. Design 302 (with or without symbols 302A) may be incorporated with stay 300 as part of the manufacturing process. For example, during the manufacturing, a sheet of chosen design, such as design 302, may be impregnated into FCF collar stay 300 to provide FCF collar stay 300 with a customized appearance, color, wording, corporate logo, or combinations thereof.

In an alternative embodiment, design 302 and symbols 302A are applied to FCF collar stay 300 after formation. In one example, designs 302 and symbols 302A are painted and/or printed onto FCF collar stay 300 using one or more colors. They may be etched or embossed into the surface of FCF collar stay 300. They may also be engraved or stamped into the surface of FCF collar stay 300.

Figure 5:
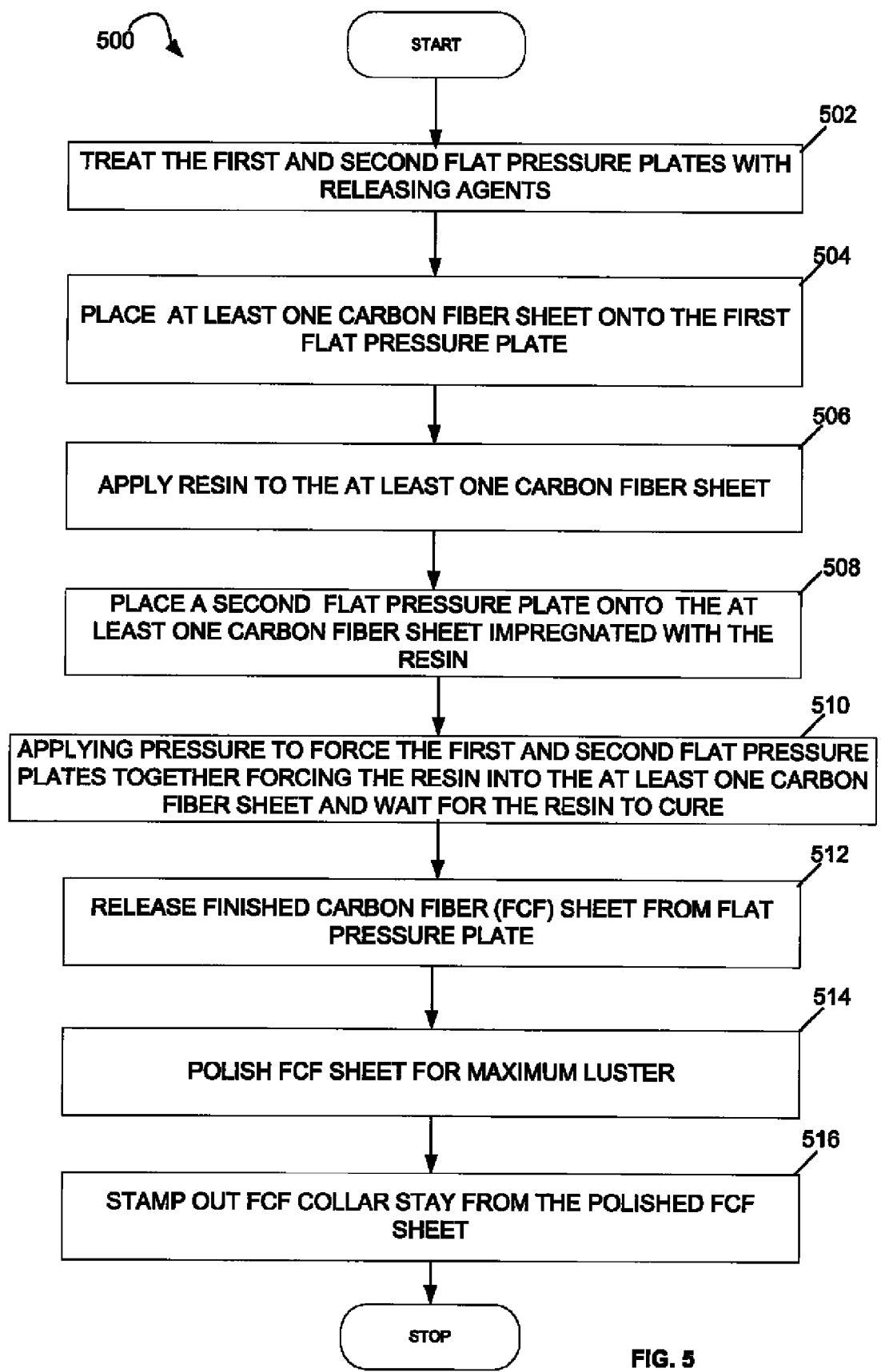
FIG. 5 shows one exemplary process for manufacturing a FCF collar stay, according to an embodiment.

FIG. 5 shows an exemplary process 500 for manufacturing a FCF collar stay. Execution of steps 502-514 of process 500 yields a FCF sheet. Step 516 produces individual FCF collar stays from the FCF sheet. One way to produce a FCF sheet is by placing at least one carbon fiber sheet in between first and a second flat pressure plates and impregnating the at least one carbon fiber sheet with resin. For example, in step 502, process 500 applies a releasing agent such as a wax or PVC agent to the first and second flat pressure plate. In step 504, at least one sheet of carbon fiber is placed onto the first flat pressure plate. If more than one sheet of carbon fiber is used, the carbon fiber sheets are overlaid onto each other, in step 504. Alternatively, in step 504, a sheet of fiber glass may be inserted between overlaid carbon fiber sheets. Optionally, a sheet of chosen design such as design 302 and symbols 302A may be placed atop of the carbon fiber sheet, in step 504 (and if more than one sheet of carbon fiber is used, design 302 and symbol 302A may be placed on top of the upper sheet such as upper sheet 106 of FIG. 4). In step 506, process 500 applies resin 102 to the carbon fiber sheet. Resin 102 may be wet resin. If there is more than one sheet of carbon fiber, a squeegee technique may be used to apply the wet resin onto the carbon fiber such that resin is impregnated in all layers of the carbon fiber sheet. In step 508, the second flat pressure plate is placed on top of the resin impregnated carbon fiber sheets. In step 510, pressure is applied to the first and second flat pressure plates to force the first and second flat pressure plates together and to force (by compression) the resin into the at least one carbon fiber sheet. The pressure also presses away existing trapped air bubbles. Air bubbles trapped in the carbon fiber sheets may reduce the strength of the FCF sheets. Curing time is dependent upon the type and amount of resin used. In step 512, the FCF sheet, which is now comprised of the carbon fiber sheet and the reinforced resin, is released from the flat pressure plates. In step 514, the FCF sheet may be polished for maximum luster. Once the FCF sheet is polished, it is ready for mass production of collar stays. In step 516, multiple FCF collar stays may be stamped out of the FCF sheet using a stamp mold. The stamp mold may include a template that is suitable for the application. The stamp mold may be an industrial die press having a custom die such as FCF collar stay 100. In an alternative embodiment, multiple FCF collar stays may be cut out of the FCF sheet using a CNC router, a CNC laser, a CNC plasma, CNC waterjet, CNC knife cutting machines, and variations thereof. A CNC (also known as computer numerical control) machine includes a computer controller that reads coded instructions and drives a machine tool such as a router, a laser, etc., to fabricate multiple FCF collar stays.

Figure 6A:
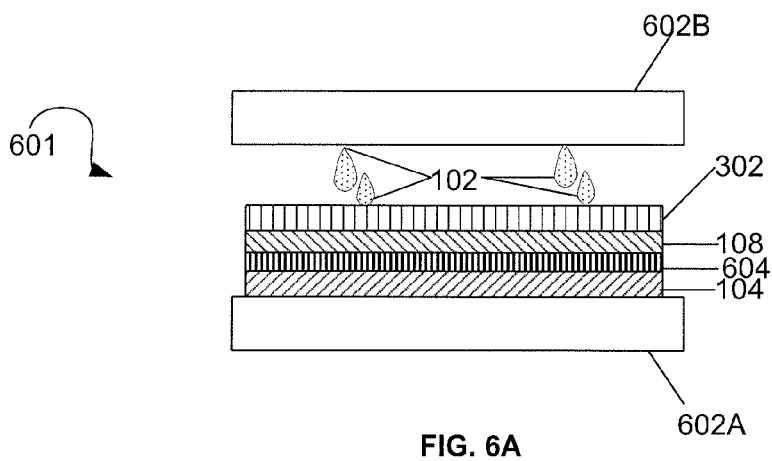
FIGS. 6A-6C show exemplary stages of the process of FIG. 5.
Figure 6B:
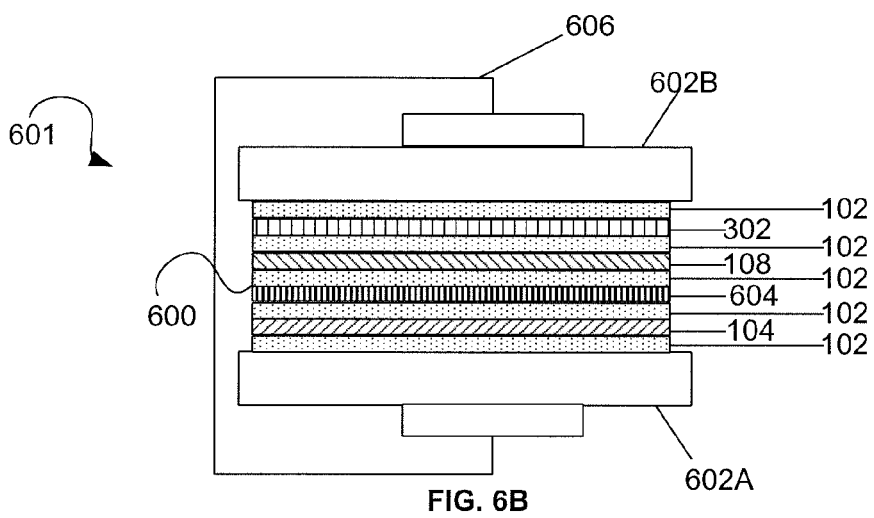
Figure 6C:
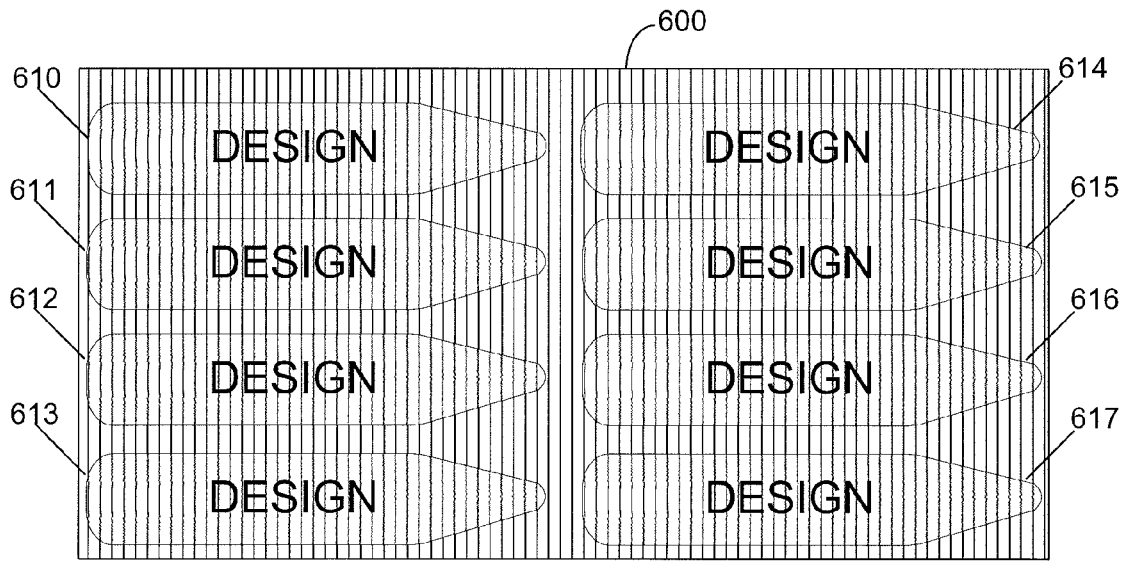

FIGS. 6A-6C show exemplary stages of process 500 of FIG. 5. In particular, FIGS. 6A-6B illustrate an exemplary stage of fabricating a FCF sheet 600 (steps 502-514), while FIG. 6C illustrates an exemplary stamp-out stage (step 516), to produce multiple FCF collar stays. FIG. 6A illustrates steps 502-508 of process 500. FIG. 6A shows an assembly 601 having a first and a second flat pressure plate 602A and 602B. A first carbon fiber sheet 104 is placed into first flat pressure plate 602A. A sheet of fiber glass 604 is placed onto the first carbon fiber sheet 104, and a second carbon fiber sheet 108 is placed onto fiberglass sheet 604. Fiberglass sheet 604 is glass-reinforced resin. A design 302 is placed on top of second carbon fiber sheet 108. Resin 102 is applied to impregnate the carbon fiber and fiberglass sheets. A squeegee technique may be used to ensure that resin 102 is impregnated evenly into carbon fiber 104, 108 and fiberglass 604 sheets as they are laid. A second flat pressure plate 602B is then positioned on top of these impregnated sheets 104, 108 and 604.

FIG. 6B depicts steps 510-514 of process 500. FIG. 6B includes a clamp 606 which applies pressure to flat pressure plates 602A and 602B, and forces resin 102 into sheets 104, 108, 604 (the impregnated sheets are shown in FIG. 6B as multiple layers of resin 102 for purposes of illustration) to form FCF sheet 600. Pressure is maintained until resin 102 cures. Curing time is dependent upon the type and amount of resin 102 used. Once resin 102 is cured, FCF sheet 600 is released from flat pressure plates 602A, 602B.

In an alternative embodiment, a vacuum bag is used instead of clamp 606 to compress together first and second flat pressure plates 602A, 602B. For example, after second flat pressure plate 602B is placed onto the impregnated carbon fiber sheet, the flat pressure plate assembly may be placed in a vacuum bag from which air is extracted. As discussed above, curing time is dependent upon the type and amount of resin.

FIG. 6C illustrates step 516. FIG. 6C shows FCF sheet 600 after being compressed by a stamp mold (not shown) so that multiple, individual FCF collar stays 610-617 may be produced. Once stamped, collar stays 610-617 may be removed from FCF sheet 600 for use.

Collar stays 610-617 thus produced may have certain advantages. First, they are generally sturdier than plastic or card-board collar stays. Second, since they are produced from carbon fiber and fiberglass, they do not generate an alarm such as through airport security. Third, each may comprise a design (e.g., initials of the owner), providing high-end appeal in apparel. Fourth, the design may comprise color or pattern to further provide aesthetic appeal or matching to clothing. Fifth, depending on the layering and arrangement of carbon fiber, collar stays thus produced may have desired flexibility or rigidity, depending on individual preference.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present methods and systems, which, as a matter of language, might be said to fall there between.

What is claimed is:

1. A method for manufacturing a finished carbon fiber (FCF) collar stay, comprising:
  providing a first and a second flat pressure plate;
  placing at least one carbon fiber sheet onto the first flat pressure plate;
  applying resin to the at least one carbon fiber sheet;
  placing a second flat pressure plate onto the first flat pressure plate on top of the at least one carbon fiber sheet and the resin;
  arranging a fiberglass sheet between the at least one carbon fiber sheet and a second carbon fiber sheet, onto the first flat pressure plate;
  applying pressure to force the first and second flat pressure plates together and to force the resin into the at least one carbon fiber sheet;

curing the resin while maintaining the pressure;
fabricating a FCF sheet having at least one design to provide a combination of rigidity and flexibility for the collar stay; and
producing multiple FCF collar stays from the FCF sheet.

2. The method of claim 1, the step of providing a first and a second flat pressure plate, comprising:
applying a releasing agent to the first and the second flat pressure plate.

3. The method of claim 2, further comprising the step of releasing the FCF sheet from the flat pressure plates.

4. The method of claim 2, further comprising the step of polishing the FCF sheet for maximum luster.

5. The method of claim 2, the step of placing at least one carbon fiber sheet comprising placing a second carbon fiber sheet onto the at least one carbon sheet to increase rigidity of the FCF sheet.

6. The method of claim 2, wherein the resin comprises epoxy.

7. The method of claim 1, the step of producing multiple FCF collar stays from the FCF sheet, comprising:
providing a stamp mold having a template of a collar stay; and
stamping out the one or more collar stays from the FCF sheet.

8. The method of claim 7, wherein the stamp mold is an industrial die press having a custom die.

9. The method of claim 1, the step of producing multiple FCF collar stays from the FCF sheet, comprising:
providing a computer numerical control (CNC) machine; and
fabricating the one or more collar stays from the FCF sheet.

10. The method of claim 9, wherein the CNC machine is selected from a group consisting of a CNC router, a CNC laser, a CNC plasma, CNC waterjet, CNC knife cutting machines, and variations thereof.

11. The method of claim 1, the step of placing a second carbon fiber sheet comprising arranging the second carbon fiber sheet with strands having different orientations from the at least one carbon fiber sheet to vary rigidity and flexibility of the FCF sheet.

12. The method of claim 1, the step of placing at least one carbon fiber sheet comprising arranging the at least one design onto the second carbon fiber sheet.

13. The method of claim 1, wherein each of the one or more FCF collar stays has the at least one design.

14. A method for manufacturing a finished carbon fiber (FCF) collar stay, comprising:
providing a first and a second flat pressure plate;
placing at least one carbon fiber sheet onto the first flat pressure plate;
applying resin to the at least one carbon fiber sheet;
placing a second flat pressure plate onto the first flat pressure plate on top of the at least one carbon fiber sheet and the resin;
arranging a fiberglass sheet between the at least one carbon fiber sheet and a second carbon fiber sheet, onto the first flat pressure plate;
arranging the second carbon fiber sheet with strands having different orientations from the at least one carbon fiber sheet to vary rigidity and flexibility of the FCF sheet;
applying pressure to force the first and second flat pressure plates together and to force the resin into the at least one carbon fiber sheet;
curing the resin while maintaining the pressure;
fabricating a FCF sheet having at least one design to provide a combination of rigidity and flexibility for the collar stay; and
producing multiple FCF collar stays from the FCF sheet.

15. A method for manufacturing a finished carbon fiber (FCF) collar stay, comprising:
providing a first and a second flat pressure plate;
placing at least one carbon fiber sheet onto the first flat pressure plate;
applying resin to the at least one carbon fiber sheet;
placing a second flat pressure plate onto the first flat pressure plate on top of the at least one carbon fiber sheet and the resin;
arranging a fiberglass sheet between the at least one carbon fiber sheet and a second carbon fiber sheet, onto the first flat pressure plate;
arranging the at least one design onto the second carbon fiber sheet;
applying pressure to force the first and second flat pressure plates together and to force the resin into the at least one carbon fiber sheet;
curing the resin while maintaining the pressure;
fabricating a FCF sheet having at least one design to provide a combination of rigidity and flexibility for the collar stay; and
producing multiple FCF collar stays from the FCF sheet.

* * * * *